United States Patent [19]

Park

[11] 3,974,900

[45] Aug. 17, 1976

[54] ROTARY DISPLACEMENT COUPLING DEVICE

[76] Inventor: DeMoss Park, P.O. Box 901, Ponca City, Okla. 74601

[22] Filed: Apr. 18, 1975

[21] Appl. No.: 569,571

Related U.S. Application Data

[63] Continuation-in-part of Ser. No. 490,050, July 19, 1974, abandoned.

[52] U.S. Cl. .......................... 192/61; 192/103 F; 192/103 FA
[51] Int. Cl.² .................. F16D 31/04; F16D 31/08
[58] Field of Search ............. 192/61, 104 F, 103 F, 192/103 FA

[56] References Cited
UNITED STATES PATENTS

| | | | |
|---|---|---|---|
| 2,101,899 | 12/1937 | Eddins | 192/61 |
| 2,281,292 | 4/1942 | Hoover | 192/61 |
| 2,306,363 | 12/1942 | Roth | 192/61 X |
| 2,372,310 | 3/1945 | Bowers et al. | 192/61 |
| 3,696,896 | 10/1972 | Hamilton | 192/61 X |

FOREIGN PATENTS OR APPLICATIONS

| | | | |
|---|---|---|---|
| 2,031,508 | 6/1970 | Germany | 192/61 |

*Primary Examiner*—Allan D. Herrmann

[57] ABSTRACT

A rotary displacement mechanical coupling device having a casing containing a first and second axially aligned chamber, said chambers having a partition therebetween. A hub is rotatably mounted through the partition and extending into both of the first and second chambers. A plurality of outer gear teeth are circumferentially spaced around the outer periphery of the first chamber. A crescent is attached to the hub means in the first chamber and has an outer radius substantially identical with the inner radius of the outer gear teeth. A pinion gear has a plurality of teeth on its periphery and has a radius substantially less than the inner radius of the outer gear teeth, is journaled on the hub so that the pinion gear teeth engage at least a portion of the outer gear teeth. The inner radius of the crescent is adjusted to have substantially the same radius as the radius of the periphery of the teeth around the pinion gear. Fluid communication channels are provided through substantially all of the teeth of the pinion gear. A second fluid communication channel is provided through the journal for the bearing and into the second chamber. A valve is provided in the second fluid communication channel to control the passage of fluids through this channel and into the second chamber.

8 Claims, 10 Drawing Figures

ROTARY DISPLACEMENT COUPLING DEVICE

RELATED APPLICATIONS

This application is a continuation in part of an application entitled "Rotary Displacement Pump" by DeMoss Park, Ser. No. 490,050, filed July 19, 1974, and now abandoned.

BRIEF DESCRIPTION OF THE PRIOR ART

The closest prior art known to the inventor is the disclosure in the above-referenced continuation in part. In that application, a rotary pump is disclosed which comprises a casing having a chamber, a cylindrical body inside the chamber where the body includes a plurality of outer teeth circumferentially positioned around its inner surface, a plurality of fluid discharge ports are in communication with the inner and outer surfaces of this cylindrical body in an inner chamber. A resilient elastomeric member is circumferentially positioned over the openings of the discharge ports through the outer surface of the cylindrical body. A drive shaft is positioned through the casing to drive a member connected to a piston having inner gear teeth matingly engaging the outer gear teeth and a crescent shaped member. A fluid inlet and a fluid discharge receiving zone are provided for receiving the discharge fluid and passing it to a fluid outlet.

BRIEF DESCRIPTION OF THE INVENTION

This invention differs from substantially from the above-described previous invention in several important respects. First, the invention, while utilizing a gear having communication means radially positioned through the gear teeth in one of the gears, does not provide such a communication means in the second gear. Further, the purpose of the invention herein described differs from the purpose of the continuation in part in that this invention can be utilized as a hydraulic coupling between two rotating shafts. The degree of coupling will be determined by the fluid which is permitted to pass from one side of the pinion gear to the other side of the pinion gear. In a situation where rigid coupling is desired, the fluid communication means will be shut off, thereby trapping the oil or other fluid in the spaces between the pinion gear and the outer gear. The oil will be substantially incompressible and thereby cause a nearly rigid coupling between the input and output shafts of this invention. The only slippage that will be encountered is the leakage around the gear teeth.

The invention can also be utilized as a variable speed coupling by merely controlling the amount of fluid that can pass from one side of the pinion gear to the other or from one side of the pinion gear to an oil reservoir and from the oil reservoir to the other side of the pinion gear. By controlling the flow of oil, the degree of rigidity of the coupling can be controlled to a high degree. Other objects and features of this invention will become apparent when the invention is fully understood from its description given in the following specification.

BRIEF DESCRIPTION OF THE FIGURES

FIG. 5b is a front view of the device shown in FIG. 5a;

DETAILED DESCRIPTION OF THE INVENTION

Figure 1:
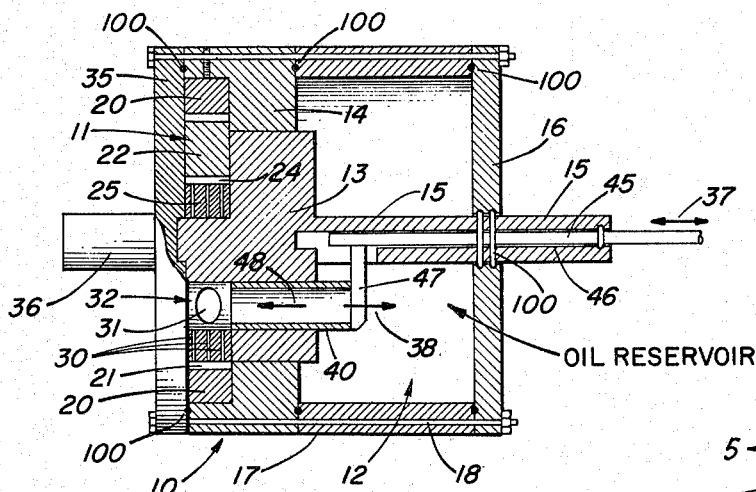
FIG. 1 is a cross-sectional view of one of the embodiments of this invention.

Referring to all of the figures, but in particular to FIG. 1, a casing generally referred to by the number 10 is illustrated and has a first chamber 11 and a second chamber 12. A hub 13 is axially mounted through a partition 14 so that it extends into chambers 11 and 12. A shaft 15 is attached to hub 13 and extends axially therefrom through cover 16. Chamber 12 may be formed by a tubular portion 17 which is attached between partition 14 and cover 16. Tubular portion 17 may be attached to cover 16 and partition 14 by any usual means, such as a bolt 18. A plurality of seals 20 may be used wherever the metal surfaces mate to prevent the escape of fluids, such as hydraulic oil, from inside chambers 11 and 12. The seals 20 are drawn for illustrative purposes only. It is well known that many types of seals can be used for each type joint, whether it is fixed or rotating. Such seals can be of several different configurations, and they do not form a part of this invention. An outer gear is attached to the inside of chamber 11 and has a plurality of teeth 21 spaced along its inner periphery. Attached to hub 13 is a crescent 22 which may be molded, mechanically attached, or formed to hub 13 in any well-known manner. Crescent 22 has an outer periphery 23 which has substantially the same radius as the inner radius of teeth 21 of outer gear 20. A pinion gear 25 is journaled on a bearing 24 which is attached to hub 13. Bearing 24 is positioned on hub 13 in a manner to permit the engagement of teeth 26 on pinion 25 with at least a portion of teeth 21 on outer gear 20. The inner radius 28 of crescent 22 has substantially the same radius as the radius of the teeth 26 on pinion gear 25.

A plurality of openings or holes 30 which pass radially from the gear teeth to the inner surface of pinion gear 25 provide a communication radially through the gear. A second communication means 31 is formed through the hub on each side of the hub. The communications 31 provide fluid communication to a passage 32 which provides fluid communication from the journal 24 to the second chamber 12.

A valve means 40 is slidably fit into communication 32 so that it can by axial movement cover passage or communication means 31. A rod 45 is axially positioned through a axial bore 46 in shaft 15. An extension 47 is attached at one end to rod 45 and at the other end to cylindrical valve 40. The first chamber is closed by a cover 35 and has a shaft 36 axially extending therefrom. Shafts 36 and 15 may be attached to any device in order to couple one machine to another, either for the purpose of operating as a clutch or for the purpose of controlling the speed of rotation of one shaft with respect to the other.

Operation

Figure 2:
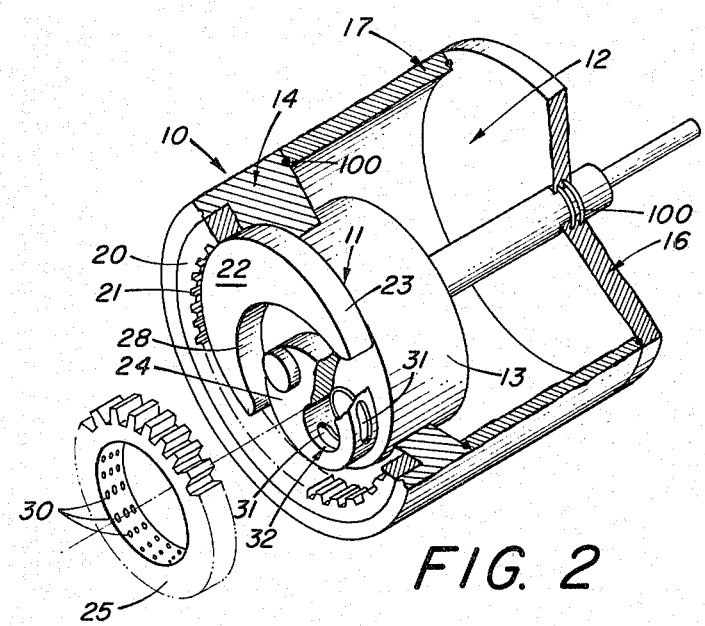
FIG. 2 is a perspective view of the interior of this invention showing the casing and cutaway view with the spur gear end exploded view.
Figure 3:
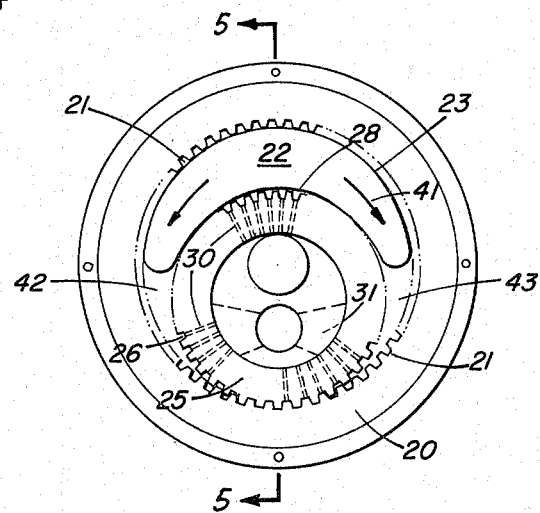
FIG. 3 is a front view of the invention illustrated in FIG. 1.

The operation of the device is best understood by referring to FIGS. 1, 2, and 3. In FIG. 1, reservoir 12 is normally partly filled with oil. It is obvious, of course, that it is preferable that the reservoir be substantially filled with oil. During normal operation, control lever 45 can be moved in either direction as indicated by arrow 37. If, for example, arrow 37 is moved to pull valve 40 in the direction of arrow 38, then passage 31 is open. Under these conditions, if shaft 15 is rotating in a direction to make the crescent move as indicated by arrow 41, oil pressure will build up in the region indicated by number 42. The oil as it builds up in pressure will be forced through communication holes 30 into passage 31 and into passage 32 which will cause it to move through the center of valve 40 and into the oil reservoir defined by the second chamber 12. The pressure in region 43, however, will be decreasing, causing oil to move from the reservoir through the center of valve 40 out passage 31 through holes 30 and into region 43. It is obvious, of course, that a certain amount of oil will pass from one side of the passage 31 to the other passage 31. However, a certain percent of the oil will be forced into reservoir 12. The large quantity of oil in reservoir 12 will provide a high degree of cooling which is generated due to the work being produced by the apparatus. If the valve is gradually moved in the direction of arrow 48, passage 31 will be cut off due to the outer wall of valve 40. As passage 31 is cut off, the flow of oil through the holes 30 in pinion gear 25 will become restricted, causing an increase in pressure in region 42 and a likewise increase in pressure in region 43. As the pressure increases, the force between teeth 26 and 21 will increase. Thus, the pinion gear 25 will begin to transfer force to outer gear 20. Since outer gear 20 is pinned to the casing 10 and to shaft 36, power will be transferred from shaft 15 to shaft 36. The amount of power that will be transferred from shaft 15 to shaft 36 will be determined by the restriction in the flow through holes 30 and passage 31 to oil reservoir 12. When valve 40 completely covers passage 31, the only oil movement will be between the gear teeth 26 and 21 and between teeth 26 and the inside radius 28 of crescent 22 and between the outer teeth 21 and the outer circumference 23 of crescent 22. Since these clearances are extremely small, very little oil will escape between the teeth and between the crescent and the teeth. As a consequence, most of the torque on shaft 15 will be delivered to shaft 36.

In view of the above, it is obvious that the device above described can be utilized as a torque converter, that is, torque can be transferred from shaft 15 to shaft 36. The device can also be used as a variable speed device since the slippage engendered in the apparatus will permit a variation in speed between shaft 15 and shaft 36.

While not shown, it is obvious that any means can be used to cool the oil in reservoir 12. For example, external fins can be attached to casing 10, or a circulation system can be mounted to provide external circulation for the oil from reservoir 12 out through a heat exchanger and back into the reservoir 12. Such systems are well known in the art and are obvious in view of the disclosure.

Figure 4:
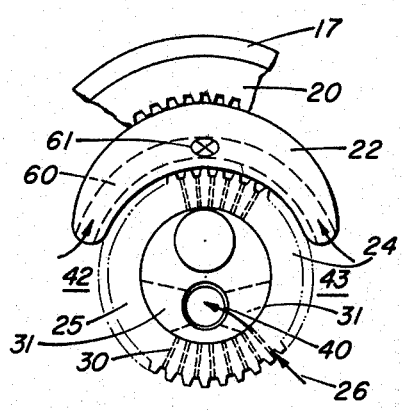
FIG. 4 is a schematic view of one modification of this invention.
Figure 5A:
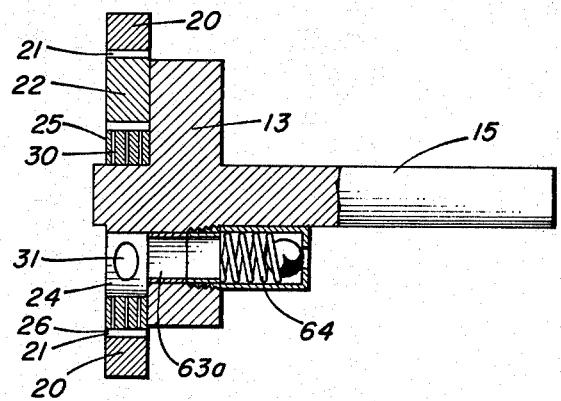
FIG. 5a is a schematic view of a further modification of this invention taken through lines 5—5 of FIG. 3.
Figure 5B:
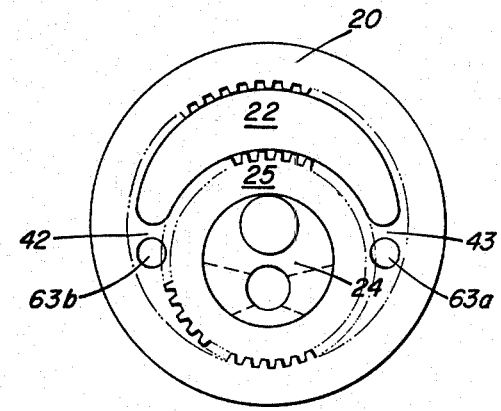

Referring to FIG. 4, a modified version of the device shown in FIGS. 1 through 3 is illustrated. In this modification, an arcuate passage 60 is formed from one side of crescent 22 to the other side of crescent 22, thereby permitting flow of fluids from region 42 to region 43. A valve 61 is interposed in passage 60 and permits controllable passage of fluid through passage 60. In the operation of the device shown in FIG. 4, the fluids can flow in the manner illustrated in FIGS. 1 through 3 or the fluids can flow through passage 60. Valve 61 can then selectively control the fluid in much the same way as does valve 40 in FIGS. 1 through 3. Valve 61 has several important features which can be utilized in conjunction with this invention. For example, valve 60 can provide a maximum torque slippage, that is, once the device has reached its maximum torque, valve 61 functioning in the manner of a check valve can provide a flow of fluids through chamber 60, thereby preventing damage to either the equipment or to the device itself. Drilling systems or tapping systems for example can require that a maximum torque be applied and then the device cause slippage in order to prevent breakage of drills or breakage of taps. Such a feature is easily provided in the manner above described. Referring to FIGS. 5A, and 5B, a passage 63 is formed through hub 13 into regions 42 and 43. Passages 63A and 63B has a ball check valve 64 mounted in communication therewith. In this embodiment, if, for example, 63A has a check valve in the manner shown, rotation of the shaft 15 in one direction will be free, that is, oil can pass freely through the reservoir and into region 63A; however, rotation in the reverse direction provided no passage 63B exists will be rigid. Thus, a device has been illustrated which will permit rotation freely in one direction and lock in the reverse direction.

Figure 6A:
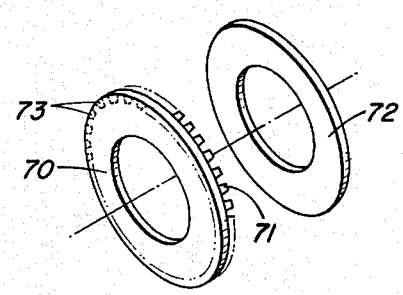
FIGS. 6A and 6B illustrate various means for manufacturing the pinion gear.
Figure 6B:
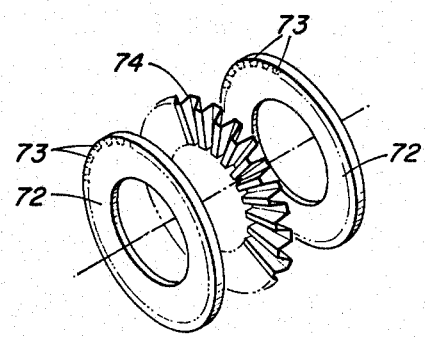

Referring to FIGS. 6A and 6B, other means of forming the pinion gear are illustrated. For example, in FIG. 6A, a milled ring 70 having a plurality of surface teeth 71 radially extending from the outer periphery to the inner opening are illustrated. A second ring 72 can then be placed against teeth 71 and the unit welded together. Gear teeth can then be cut in the manner illustrated by dotted lines 73, thereby forming the pinion gear. FIG. 6B illustrates a second method whereby a corrugated ring 74 can be positioned between two rings 72 and welded. Teeth 73 can then be formed in the manner illustrated by the dotted lines and a second form of pinion gear generated. It is obvious from viewing these figures that pinion gears can be formed in the manner shown in FIGS. 6A and 6B or by drilling a plurality of radial holes as illustrated in the remainder of the drawings.

Figure 7:
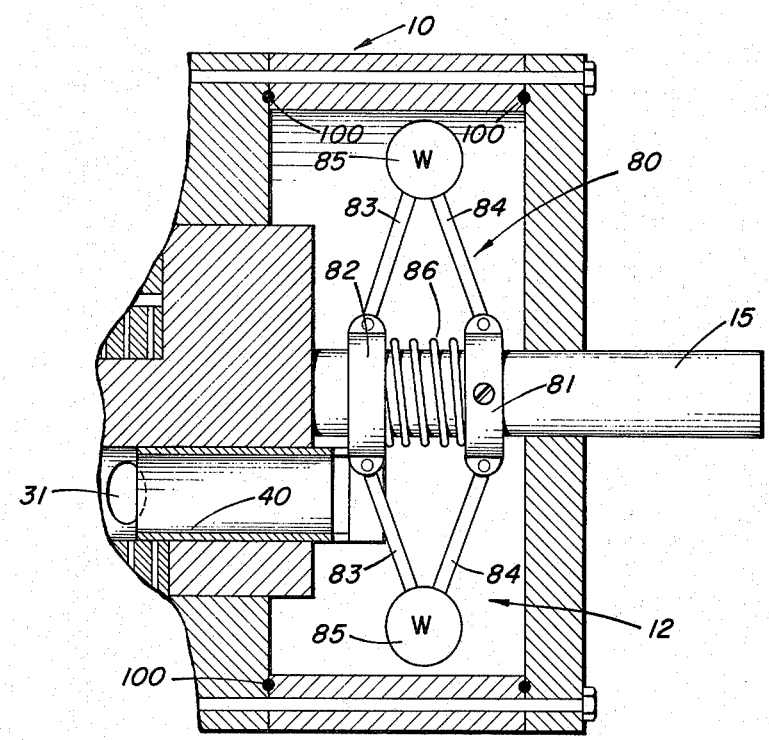
FIG. 7 is a cross-sectional view similar to FIG. 3 with a modified valve control means; and, FIG. 8 is a further modification of the control valve.
Figure 8:
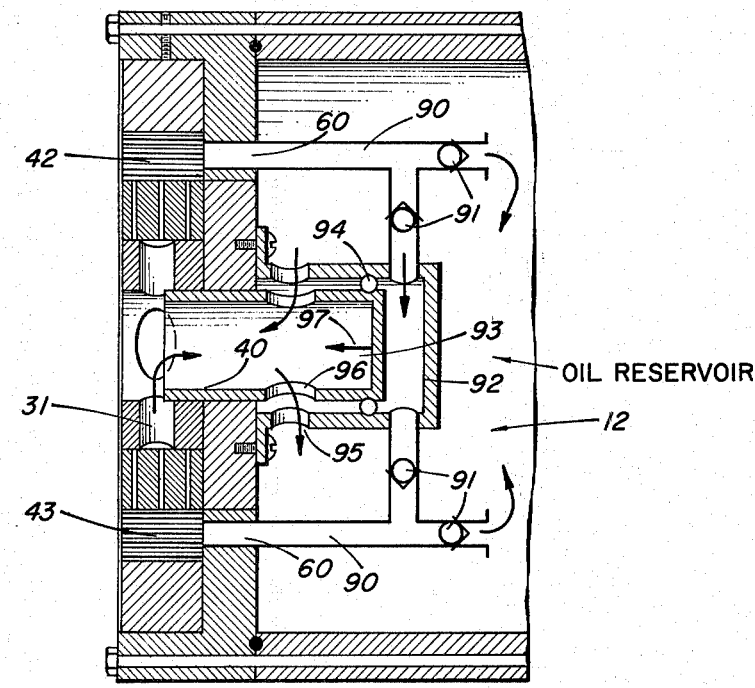

Referring to FIG. 7, one form of speed control is illustrated. In this form, an ordinary rotating weight governor generally referred to by the arrow 80 is illustrated. This governor is attached by a ring 81 to shaft 15 and by a slidable ring 82 to shaft 15. Arms 83 and 84 support a weight 85. Valve 40 is attached to ring 82 in any desired manner. A spring 86 is positioned between rings 82 and 81. When shaft 15 is rotated since valve 40 will be closed the entire assembly consisting of valve 15, casing 10, and shaft 36 will commence rotating. As the speed increses, ball weights 85 will move outward toward the outer portion of casing 10. As the ball weights move out, ring 82 will advance toward ring 81. This will pull valve 40 in the direction of ring 81, exposing passage or communications 31. Oil will then begin to flow in the usual manner through the holes in the pinion ring into passage 31 through valve 40 and into reservoir 12. As the valve opens, the coupling between shaft 15 and 36 will begin to slip. Thus, a maximum speed will be reached which is determined by the torque on 36 and the maximum rotational speed of shaft 15. It is obvious, of course, that other arrangements of governors can be utilized, for example, weights, etc, which are attached to valve 40. A further embodiment is illustrated in FIG. 8. In this embodiment, valve 40 is moved by passages 60 (see FIGS. 5A and 5B) and are coupled through a pipe 90 and check valve 91 to a piston chamber 92. A piston 93 which may be sealed by a ring 94 is coupled directly to valve 40. Openings 95 and 96 are provided through the valve and the lower portion of piston chamber 92 to permit free passage of oil through passages 31, valve 40, and into chamber 12. In this device, as the pressure builds up in regions 42, for example, oil will flow down pipe 90 through check valve 91 and into piston chamber 92. The increase in pressure will force piston 93 in the direction of arrow 97, causing the valve 40 to move in a manner covering passages 31. In this system then, a system is illustrated which provides slippage initially until rotation is achieved. As rotation is achieved and pressure increases, the valve 40 will gradually be closed, causing the coupling between shafts 15 and 36 to become rigid. Such a device is extremely useful on small horsepower vehicles which require little horsepower to be applied when the vehicle is initially started and increased horsepower to the vehicle as the speed of the engine increases.

Conclusions

An extremely versatile mechanical coupling or clutch device has been illustrated. This device provides freedom of coupling between two shafts such that an increase in torque can be achieved in several ways, either by closing a valve mechanically or by closing a valve automatically. The device also provides through appropriate valves and check valves for a system of limiting the torque that can be delivered between the two shafts. The system also provides for a slippage during low rotations and a rigid coupling during high rotations. It is obvious that other configurations and changes can be made in the invention and still be well within the scope of the invention as defined in this specification and the appended claims.

What I claim is:

1. A rotary displacement mechanical coupling device comprising:
   a. a casing means containing a first chamber enclosing each end;
   b. a fluid reservoir means;
   c. a hub rotatably mounted through one of said partitions;
   d. a plurality of outer gear teeth circumferentially spaced around the periphery of said first chamber;
   e. a crescent means attached to said hub means in said first chamber and having a radius substantially identical with the inner radius of said outer gear teeth;
   f. a pinion gear having teeth on its periphery and having a radius less than the inner radius of said outer gear teeth;
   g. means for journaling said pinion gear to said hub so that said pinion gear teeth engage at least a portion of said outer gear teeth;
   h. a first fluid communication means passing radially through substantially all of said pinion teeth;
   i. a second fluid communication means passing from the outside of said means for journaling through said hub and to said fluid reservoir means; and,
   j. means in said second fluid communication means to selectively control the flow of fluids through said second communication means and into said fluid reservoir means.

2. A device as described in claim 1 wherein said first fluid communication means comprises a plurality of openings radially formed through said pinion gear.

3. A device as described in claim 1 wherein a third communication means passes from one side of said crescent to the other side of said crescent and means interposed in said third communication means for selectively controlling the passage of fluids therethrough.

4. A device as described in claim 1 wherein a communication means passes from said first chamber into said fluid reservoir means, beginning in said first chamber at the terminus of said crescent and through said hub means, and means for controlling the passage of fluid through said passage.

5. A device as described in claim 1 wherein said second fluid communication means passing from the outside of said means for journaling through said hub and into said fluid reservoir means comprises a cylindrical opening and wherein said means for selectively controlling the flow of fluids through said second communication means comprises a cylindrical tube and mechanical means for sliding said cylindrical tube to block fluid communication means passing through said first communication means.

6. A device as described in claim 5 wherein said means for mechanically sliding said cylindrical tube comprises a hydraulically operated piston means.

7. A device as described in claim 5 wherein said mechanical means for sliding said cylindrical valve comprises a rod axially positioned through said shaft having means coupled to said rod engaging said cylindrical valve.

8. A device as described in claim 5 wherein said means for mechanically sliding said cylindrical valve comprises a ball governor.

* * * * *